(12) United States Patent
Nystad (10) Patent No.: US 9,959,092 B2
(45) Date of Patent: May 1, 2018

(54) ACCUMULATION OF FLOATING-POINT VALUES

(71) Applicant: ARM LIMITED, Cambridge (GB)

(72) Inventor: Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 33 days.

(21) Appl. No.: 15/060,778

(22) Filed: Mar. 4, 2016

(65) Prior Publication Data

US 2016/0306608 A1 Oct. 20, 2016

(30) Foreign Application Priority Data

Apr. 17, 2015 (GB) .................... 1506567.5

(51) Int. Cl.
*G06F 7/485* (2006.01)
*G06F 7/499* (2006.01)

(52) U.S. Cl.
CPC .......... *G06F 7/485* (2013.01); *G06F 7/49968* (2013.01); *G06F 7/49973* (2013.01)

(58) Field of Classification Search
None
See application file for complete search history.

(56) References Cited

U.S. PATENT DOCUMENTS

| | | | | |
|---|---|---|---|---|
| 5,490,100 A * | 2/1996 | Kableshkov | ............ | G06F 7/485 708/505 |
| 6,205,461 B1 * | 3/2001 | Mansingh | ............... | G06F 7/485 708/211 |
| 2003/0028572 A1 * | 2/2003 | Hoskote | .............. | G06F 7/49942 708/495 |
| 2005/0177610 A1 | 8/2005 | Wang | | |
| 2012/0215823 A1 * | 8/2012 | Lutz | ........................ | G06F 7/485 708/209 |
| 2012/0259905 A1 * | 10/2012 | Kan | .................... | G06F 7/49942 708/505 |
| 2012/0259906 A1 * | 10/2012 | Kan | .................... | G06F 7/49942 708/505 |
| 2016/0248439 A1 * | 8/2016 | Tanaka | ..................... | H03M 7/24 |
| 2016/0306608 A1 * | 10/2016 | Nystad | .................... | G06F 7/485 |

OTHER PUBLICATIONS

GB Search Report for GB1506567.5 dated Oct. 12, 2015, 3 pages.

(Continued)

*Primary Examiner* — David H Malzahn (74) *Attorney, Agent, or Firm* — Nixon & Vanderhye P.C.

(57) ABSTRACT

An apparatus and method for generating a sum of floating-point input values are provided. To sum the values multiple partial sum floating-point values are maintained and the partial sum to which an input value may be added is selected by a least significant portion of the exponent of the input value. If the exponent of the input value is equal to the exponent of the value stored in the selected partial sum a mantissa sum of the input value and stored partial sum value replaces the mantissa value of the selected partial sum value. If the exponent of the input value is larger than the exponent of the value stored in the selected partial sum the selected partial sum value is replaced with the input value. An associative and deterministic summation is thus provided.

19 Claims, 6 Drawing Sheets

(56) References Cited

OTHER PUBLICATIONS

Kirchner et al., "Arithmetic for Vector Processors", *IEEE 8$^{th}$ Symposium on Computer Arithmetic*, May 1987, pp. 256-269.
J. Shewchuk, "Adaptive Precision Floating-Point Arithmetic and Fast Robust Geometric Predicates", *School of Computer Science*, Carnegie Mellon University, May 17, 1996, 57 pages.
D. Bailey, "High-Precision Software Directory", Apr. 9, 2015, 1 page.
Dr. Dobb's, "Floating-point Summation", *The World of Software Development*, Sep. 1, 1996, 4 pages.
J. Demmel et al., "Fast Reproducible Floating-Point Summation", *ARITH '13 Proceedings of the 2013 IEEE 21st Symposium on Computer Arithmetic*, Apr. 7, 2013, pp. 163-172.
Jawed, "Unified Shader Architecture: Point sampling in addition to Bilinear Texturing", *3D Architectures & Chips*, Apr. 29, 2006, 6 pages.

\* cited by examiner

ACCUMULATION OF FLOATING-POINT VALUES

This application claims priority to GB Patent Application No. 1506567.5 filed 17 Apr. 2015, the entire content of which is hereby incorporated by reference.

TECHNICAL FIELD

The present disclosure relates to data processing. More particularly it relates to the accumulation of floating-point values to generate a sum.

BACKGROUND

It is known in the field of data processing to provide an accumulator to generate a sum of multiple input values. However a particular difficulty which arises with respect to the configuration of such an accumulator for floating-point values is that in most implementations floating-point addition is non-associative, i.e. the result of adding three or more numbers depends on the order in which the additions are performed. This is due to the fact that the large range of the floating-point number encoding makes it almost inevitable that there will be loss of precision and that this loss will be different depending on the order the values are summed.

Such non-deterministic outcomes for calculations are typically rather undesirable in the context of a data processing apparatus and therefore it is known to seek to avoid them by, say, limiting the precision of the output sum such that any variations are hidden below the precision of the output sum to achieve an exact final sum or imposing constraints on the order in which the floating-point values may be summed.

SUMMARY

Viewed from a first aspect an apparatus is disclosed for generating a sum of floating-point input values, the apparatus comprising: storage circuitry to store multiple partial sum floating-point values; selection circuitry to select a partial sum floating-point value of the multiple partial sum floating-point values in dependence on a least significant portion of a first exponent value for a floating-point input value; comparison circuitry to compare the first exponent value with a second exponent value stored for the selected partial sum floating-point value; and accumulation circuitry to perform an addition procedure, wherein the addition procedure comprises: replacing a mantissa value of the selected partial sum floating-point value with a mantissa sum of the floating-point input value and the selected partial sum floating-point value, when the first exponent value and the second exponent value are equal; and replacing the selected partial sum floating-point value with the floating-point input value in the selected partial sum floating-point value, when the first exponent value is larger than the second exponent value.

Viewed from a second aspect a method is disclosed of generating a sum of floating-point input values in a data processing apparatus comprising the steps of: storing multiple partial sum floating-point values; selecting a partial sum floating-point value of the multiple partial sum floating-point values in dependence on a least significant portion of a first exponent value for a floating-point input value; comparing the first exponent value with a second exponent value stored for the selected partial sum floating-point value; and performing an addition procedure, wherein the addition procedure comprises: replacing a mantissa value of the selected partial sum floating-point value with a mantissa sum of the floating-point input value and the selected partial sum floating-point value, when the first exponent value and the second exponent value are equal; and replacing the selected partial sum floating-point value with the floating-point input value in the selected partial sum floating-point value, when the first exponent value is larger than the second exponent value.

Viewed from a third aspect a computer-readable storage medium is disclosed in which are stored in a non-transient fashion computer-readable program instructions, wherein when executed on a computing device the computer-readable program instructions cause the computing device to carry out the method of the second aspect.

Viewed from a fourth aspect software is disclosed which when executed on a computing device causes the computing device to carry out the method of the second aspect.

Viewed from a fifth aspect an apparatus is disclosed for generating a sum of floating-point input values comprising: means for storing multiple partial sum floating-point values; means for selecting a partial sum floating-point value of the multiple partial sum floating-point values in dependence on a least significant portion of a first exponent value for a floating-point input value; means for comparing the first exponent value with a second exponent value stored for the selected partial sum floating-point value; and means for performing an addition procedure, wherein the addition procedure comprises: replacing a mantissa value of the selected partial sum floating-point value with a mantissa sum of the floating-point input value and the selected partial sum floating-point value, when the first exponent value and the second exponent value are equal; and replacing the selected partial sum floating-point value with the floating-point input value in the selected partial sum floating-point value, when the first exponent value is larger than the second exponent value.

Viewed from a sixth aspect there is disclosed a virtual machine comprising a computing device executing a program to provide an apparatus according to the first aspect.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

In at least some embodiments there is an apparatus for generating a sum of floating-point input values, the apparatus comprising: storage circuitry to store multiple partial sum floating-point values; selection circuitry to select a partial sum floating-point value of the multiple partial sum floating-point values in dependence on a least significant portion of a first exponent value for a floating-point input value; comparison circuitry to compare the first exponent value with a second exponent value stored for the selected partial sum floating-point value; and accumulation circuitry to perform an addition procedure, wherein the addition procedure comprises: replacing a mantissa value of the selected partial sum floating-point value with a mantissa sum of the floating-point input value and the selected partial sum floating-point value, when the first exponent value and the second exponent value are equal; and replacing the selected partial sum floating-point value with the floating-point input value in the selected partial sum floating-point value, when the first exponent value is larger than the second exponent value.

In order to perform the accumulation of floating-point input values, the apparatus maintains multiple floating-point partial sums. The number of these partial sums maintained can vary, but in some embodiments in which the floating-point input values are, for example, in 64-bit double precision format as defined by the IEEE 754-2008 standard, the maintenance of four partial sums has been found to be a useful choice in the application of the present techniques. Each floating-point input value to be accumulated causes one of these partial sums to be selected, and to which it may be added in dependence on the relative sizes of that floating-point input value and the currently held value in that selected partial sum. The selection of the partial sum for a given floating-point input value is made in dependence on a least significant portion of the exponent of the floating-point input value, with the effect that the contributions of each partial sum to the final sum are interleaved across the range of floating-point values that can be represented for that final sum. The size of the least significant portion of the exponent used for this purpose can vary, but in some embodiments such as those mentioned above in which the floating-point input values are in 64-bit double precision format, where four partial sums are maintained, the least significant portion can correspond to these four partial sums in that it is the two least significant bits of the exponent.

Once a partial sum has been selected to which the floating-point input value may be accumulated, an addition procedure is carried out in which a) if the respective exponents of the floating-point input value and the current value of the selected partial sum are equal, their mantissas values are added and the result replaces the current mantissa value of the selected partial sum; and b) if the exponent of the floating-point input value is larger than the exponent of the current value of the selected partial sum, the floating-point input value replaces the selected partial sum floating-point value. In at least some embodiments, no changes are made to the selected partial sum when the exponent of the floating-point input value is smaller than the exponent of the current value of the selected partial sum.

The maintenance of the multiple partial sums in combination with the above-described addition procedure with respect to these multiple partial sums results in an associative addition of the floating-point input values. This is because the representable range of floating-point numbers is sub-divided, across the multiple partial sums, into multiple "buckets" to which a particular floating-point input value may contribute. Note that the multiplicity of these buckets will typically be greater than the multiplicity of the partial sums in order to provide the above mentioned interleaving of the contributions of the partial sums. The number of these buckets also depends on the particular exponent range of the floating-point values being handled. For example, in some embodiments such as those mentioned above in which the floating-point input values are in 64-bit double precision format, where four partial sums are maintained, there may be 71 buckets (see also further discussion below on the determination of this number of buckets). In combination with the procedure for the selection of a partial sum, this sub-divides these buckets into a number of classes, given by the number of partial sums being maintained. Thus in embodiments in which four partial sums are maintained, and labelling these bucket classes from 0 to 3, bucket-class 0 consists of buckets {0, 4, 8, 12, . . . }, bucket-class 1 consists of buckets {1, 5, 9, 13, . . . }, bucket-class 2 consists of buckets {2, 6, 10, 14, . . . } and bucket-class 3 consists of buckets {3, 7, 11, 15, . . . }.

It will be understood from the above discussion that the number of multiple partial sums can vary between embodiments and is an implementation choice. It is possible to use either fewer or more partial sums than four. Fewer than four partial sums may have implementation difficulties, for example (since three is not a power-of-two) three partial sums may be awkward to work with in a typical data processing environment, and only two partial sums may be deemed to be insufficient to provide the desired distribution of buckets between bucket classes. Alternatively with more than four partial sums it is possible to reduce the number of data items that are thrown away, and thereby get a more accurate sum. However in embodiments in which the floating-point input values are in the 64-bit double precision format, four partial sums are maintained, and a selected 130-bit intermediate format (see below) is used it results that elements that are a factor of $2^{87}$ or more smaller than the largest element may be thrown away, and this already supports a precision of the final sum which is sufficient for many computational purposes.

The addition procedure described above will, for each bucket class, track a sum for the highest (in terms of the absolute value of the content held therein) bucket seen, while ensuring that all lower buckets in the class have their contributions discarded (because if the exponent of the floating-point input value is larger than the exponent of the current value of the selected partial sum, the floating-point input value replaces the selected partial sum floating-point value). Since a determination of "Maximum Value" is associative, the highest bucket in each bucket class will be the same for all possible evaluation orders. Further, since "Integer Add" is associative, the sum of the floating-point input values contributing to any (non-ignored) bucket will be the same for all possible evaluation orders.

As such, the present techniques enable an accumulation of floating-point values in a manner that supports the full range of representable floating-point values and produces the same result for every possible operation order (it is associative). The deterministic final sum (of the partial sums combined) is insensitive to the order of accumulation (i.e. it is associative) for a bound number of worst-case numbers (at the limits of the floating point numbers representations and/or the particular configuration of the embodiment—to be discussed in more detail below). In other words, the sum will be guaranteed to be valid for a given number of values summed. Note that for the sake of strict linguistic accuracy the term "valid" instead of "correct" is used, since due to the non-associativity of floating point addition there may be a large set of valid sums depending on the order of the summations, and no particular sum can be elevated to the status of the "correct" sum (in the sense that the others are not so). However, the present techniques provide that one of the valid sums will be output, and that the same sum will be output for the same set of input values independent of the summation order.

In some embodiments, the apparatus further comprises conversion circuitry to convert the floating-point input value into an intermediate format, wherein an encoding space for the floating-point input value in the intermediate format is larger than an encoding space in an input format for the floating-point input as received by the conversion circuitry, and wherein the storage circuitry, selection circuitry, comparison circuitry and accumulation circuitry process the floating-point input value in the intermediate format. The particular manner in which the encoding space for the floating-point input value is larger than the encoding space in the input format of the floating point input value can vary between embodiments, but in some embodiments, where the floating-point input value is received in 64-bit format, the intermediate format is 130-bit. This extra encoding space in the intermediate format (which is then used by the storage circuitry, selection circuitry, comparison circuitry and accumulation circuitry) allows for significant expansion of, in particular, the representation of the multiple partial sum floating-point values, so that many floating-point input values can be accumulated without the representation overflowing.

In some embodiments an expressible exponent range of values in the intermediate format is smaller than an expressible exponent range of values in the input format of the floating-point input value. The particular manner in which the expressible exponent range of values in the intermediate format is smaller than the expressible exponent range of values in the input format of the floating-point input value can vary between embodiments, but in some embodiments, where the floating-point input value is received in a 64-bit format double precision format which uses 11 bits to represent the exponent, and where the intermediate format is 130-bit, 7 bits are used to represent the exponent. In order to use this representation in the intermediate format a scaling factor for the input format exponent value may need to be applied to represent the exponent value in the intermediate format. Moreover, the application of such a scaling factor will typically then require the mantissa component to be correspondingly shifted or, expressed in the converse, where it is desired to shift the mantissa component within a given (perhaps expanded—see below) encoding space provided therefor in order to allow many floating-point input values to be accumulated without the representation of the mantissa component overflowing, the shift of the mantissa component can be balanced by the use of corresponding exponent scaling factor.

In some embodiments an expressible mantissa range of values in the intermediate format is larger than an expressible mantissa range of values in the input format of the floating-point input values. The particular manner in which the expressible mantissa range of values in the intermediate format is larger than the expressible mantissa range of values in the input format of the floating-point input value can vary between embodiments, but in some embodiments, where the floating-point input value is received in a 64-bit format double precision format which uses 52 explicit (and 1 implicit) bits to represent the mantissa, the intermediate format uses 123 bits to represent the mantissa. This significant expansion of the encoding space available to represent the mantissa (and thus the expressible mantissa range of values in the intermediate format) is a particular way in which the above-mentioned expansion of the representation of the multiple partial sum floating-point values can be supported, so that many floating-point input values can be accumulated without the representation of the mantissa component overflowing.

In some embodiments, the conversion circuitry is capable of applying a radix when converting the floating-point input value into the intermediate format, wherein the radix is an exponent multiplicative factor to decrease the size of the encoding of the first exponent value when expressed in the intermediate format. Such a radix (i.e. exponent multiplicative factor) thus represents an example of the above-mentioned scaling factor for the input format exponent value to represent the exponent value in the intermediate format. Thus it can be implicit in the, say 7-bit, exponent representation used in the intermediate format that such a predetermined radix has been used to reduce the size of the encoding (e.g. 11 bit) of the exponent value of the floating-point input value. The particular size of the radix used can vary between embodiments, but in some embodiments, where the floating-point input value is received in a 64-bit format double precision format which uses 11 bits to represent the exponent, the radix is $2^{29}$. This particular choice of radix explains the above mentioned example of 71 "buckets", because in this example (using the 64-bit double precision input format) the exponent can range from 0 to 2047 and the number 71 comes from ceil(2047/29)=71. It will be understood from the above discussion that it is possible to use a radix other than $2^{29}$. Using a smaller radix will reduce the number of bits which are needed to accommodate the mantissa shift—if all other factors are kept the same, this increases the number of floating-point input values that can be added together before an overflow can take place. Using a larger radix requires a larger mantissa shift and thereby reduces the number of floating-point values that can be added together, but will reduce the number of data items thrown away in the partial sums.

In some embodiments the conversion circuitry is capable of converting a mantissa value and a sign value of the floating-point input value into a two's complement representation for the intermediate format. Using a two's complement representation for the intermediate format simplifies the summation of two values since in two's complement form two values to be summed need merely be added regardless of their respective "polarities" (i.e. whether they are positive or negative values). However mantissa representations other than two's complement may also be used. For example, a sign-magnitude representation would simplify the conversions between a 64-bit floating point input format and the 130-bit intermediate format, and add the ability to represent "minus zero", but complicates the summation step.

In some embodiments, where two's complement representation for the intermediate format is used and a radix is applied, the conversion circuitry has subtraction circuitry to subtract one from the first exponent value in the input format, and division circuitry to then divide the first exponent value by the radix, to give the first exponent value in the intermediate format.

Further, in some such embodiments the conversion circuitry comprises shift circuitry to left-shift the two's complement representation of the mantissa value by a remainder of division of the first exponent value by the radix to give the mantissa value in the intermediate format.

As mentioned above, the use of a two's complement representation for the intermediate format is not essential and in some embodiments the conversion circuitry is capable of converting a mantissa value of the floating-point input value into a sign magnitude representation for the intermediate format.

In some embodiments the conversion circuitry has substitution circuitry to substitute a value of one for the first exponent value for the floating-point input value in the input format in response to reception of a denormal floating-point input value. The substitution circuitry may also cause an implicit mantissa bit to be set to zero before a conversion to two's-complement format takes place. This enables a denormal floating-point input value to be handled by the remainder of the components of the apparatus according to various embodiments described herein, without requiring further special handling for such denormal numbers to be provided.

In some embodiments the storage circuitry has structure to store the multiple partial sum floating-point values without a least significant portion of the second exponent value, wherein the least significant portion of the second exponent value matches the least significant portion of the first exponent value in size, and wherein the least significant portion of the second exponent value matches the number of the multiple partial sum floating-point values, such that the least significant portion of the second exponent value can be inferred from the multiple partial sum floating-point value in which it is stored. Because the partial sum floating-point value of the multiple partial sum floating-point values to which a floating-point input value may be added is selected in dependence on a least significant portion of the exponent value of that floating-point input value, that least significant portion of the exponent value need not explicitly be stored since it can be inferred from (an index of) the partial sum. For example where the intermediate format is 130-bit, and four partial sums are maintained, only the most significant 128 bits of each partial sum need be stored, because the two least significant bits of each partial sum are known from the numbering of each partial sum (0-3). It will be understood from the above discussion however that storing partial sums of a size other than 128 bits is also possible. For example, for a 32-bit floating-point input value and using a radix of $2^{16}$ and also maintaining four partial sums, it may make sense to use a 66-bit intermediate format (thus explicitly storing 64-bit partial sums). This would allow about 2 million elements to be added associatively, with only elements that are a factor of $2^{48}$ smaller than the maximum value being thrown away.

In some embodiments the addition procedure comprises performing the mantissa sum concurrent with the comparison circuitry comparing the first exponent value with the second exponent value. This can provide processing speed advantages, since in terms of hardware (circuitry) to implement this, for example for the described 130-bit intermediate format having a 123-bit mantissa representation, a summation circuit of the accumulation circuitry will perform a 123-bit integer addition of the mantissas, while at the same time the accumulation circuitry compares the exponents in order to determine whether to use the addition-sum or just keep one of the two inputs. The delay of such a summation circuit is one addition and one multiplexer, which can generally be expected to fit into just one execution cycle.

In some embodiments the apparatus comprises resolution circuitry, responsive to an indication that all floating-point input values for the sum have received and processed, to convert each of the multiple partial sum floating-point values to an output format and then to sum the input formatted multiple partial sum floating-point values in a predefined order to give the sum for output in the output format. Once it is known that all floating-point input values that should be summed have been processed, an efficient manner of generating the final sum is first to convert each of the partial sums accumulated into the required output format (e.g. 64-bit double precision floating-point). To then ensure that the above-discussed deterministic nature of the final sum (of the partial sums combined) is provided, the multiple partial sum floating-point values are summed in a predefined order.

The output format may vary between embodiments but in some embodiments the output format is the input format. However in other embodiments the output format is wider than the input format. This can be supported by providing a "widening accumulator" which is arrange to generate output values which are in some manner of a longer format that the input format of the input values it receives. For example output values in 64-bit format may be generated from 32-bit format input values.

In order to handle particular instances of "special numbers", in some embodiments the apparatus comprises special number conversion circuitry responsive to reception of an a floating-point input value representing infinity or Not-a-Number in the input format to: convert the floating-point input value number to a representation with an all-ones exponent and an all-zeroes mantissa; store a positive infinity value in a first partial sum floating-point value of the multiple partial sum floating-point values; store a negative infinity value in a second partial sum floating-point value of the multiple partial sum floating-point values; and store a Not-a-Number value in a third partial sum floating-point value of the multiple partial sum floating-point values. As such the apparatus can take advantage of the fact that it is maintaining multiple partial sums in order to store representations of a positive infinity value, a negative infinity value and a Not-a-Number value in place of three of the partial sums. These special values will then persist to the end of the accumulation process (since, mathematically speaking, whatever is added to the values positive infinity, negative infinity or Not-a-Number does not change those values) and finally these values, if present, can be used to form an appropriate final value (for example according to IEEE rules for handling such special case numbers). Moreover note that the final output value may not be directly given by a special case number that has been received as an input value, for example, in the case where both a positive infinity and a negative infinity are present in the input, this causes the final sum to be Not-a-Number, even if there were no actual Not-A-Numbers in the input. The use of the all-ones exponent for the replacement value for the floating-point input value means that, in a four partial sum configuration, that replacement value will then be added to the fourth partial sum (indexed by the 2-bit value 11). The three special numbers positive infinity, negative infinity and Not-a-Number can then be stored in the other three partial sums (indexed by the 2-bit values 00, 01 and 10).

Further, in some embodiments the apparatus is responsive to detection of a partial sum floating-point value having the all-ones exponent to convert the partial sum floating-point value having the all-ones exponent into a representation of infinity or Not-a-Number in the input format to be output as the sum. In other words, in dependence on the nature of the special number input value received, the apparatus can then output a corresponding representation (positive infinity, negative infinity or Not-a-Number respectively as appropriate). As such, an efficient manner of supporting the handling of Infinity/NaN values is provided, while retaining associativity.

In at least some embodiments there is a method of generating a sum of floating-point input values in a data processing apparatus comprising the steps of: storing multiple partial sum floating-point values; selecting a partial sum floating-point value of the multiple partial sum floating-point values in dependence on a least significant portion of a first exponent value for a floating-point input value; comparing the first exponent value with a second exponent value stored for the selected partial sum floating-point value; and performing an addition, wherein the addition procedure comprises: replacing a mantissa value of the selected partial sum floating-point value with a mantissa sum of the floating-point input value and the selected partial sum floating-point value, when the first exponent value and the second exponent value are equal; and replacing the selected partial sum floating-point value with the floating-point input value in the selected partial sum floating-point value, when the first exponent value is larger than the second exponent value.

In at least some embodiments there is a computer-readable storage medium in which are stored in a non-transient fashion computer-readable program instructions, wherein when executed on a computing device the computer-readable program instructions cause the computing device to carry out the method described above.

In at least some embodiments there is software which when executed on a computing device causes the computing device to carry out the method described above.

In at least some embodiments there is an apparatus for generating a sum of floating-point input values comprising: means for storing multiple partial sum floating-point values; means for selecting a partial sum floating-point value of the multiple partial sum floating-point values in dependence on a least significant portion of a first exponent value for a floating-point input value; means for comparing the first exponent value with a second exponent value stored for the selected partial sum floating-point value; and means for performing an addition procedure, wherein the addition procedure comprises: replacing a mantissa value of the selected partial sum floating-point value with a mantissa sum of the floating-point input value and the selected partial sum floating-point value, when the first exponent value and the second exponent value are equal; and replacing the selected partial sum floating-point value with the floating-point input value in the selected partial sum floating-point value, when the first exponent value is larger than the second exponent value.

Figure 1:
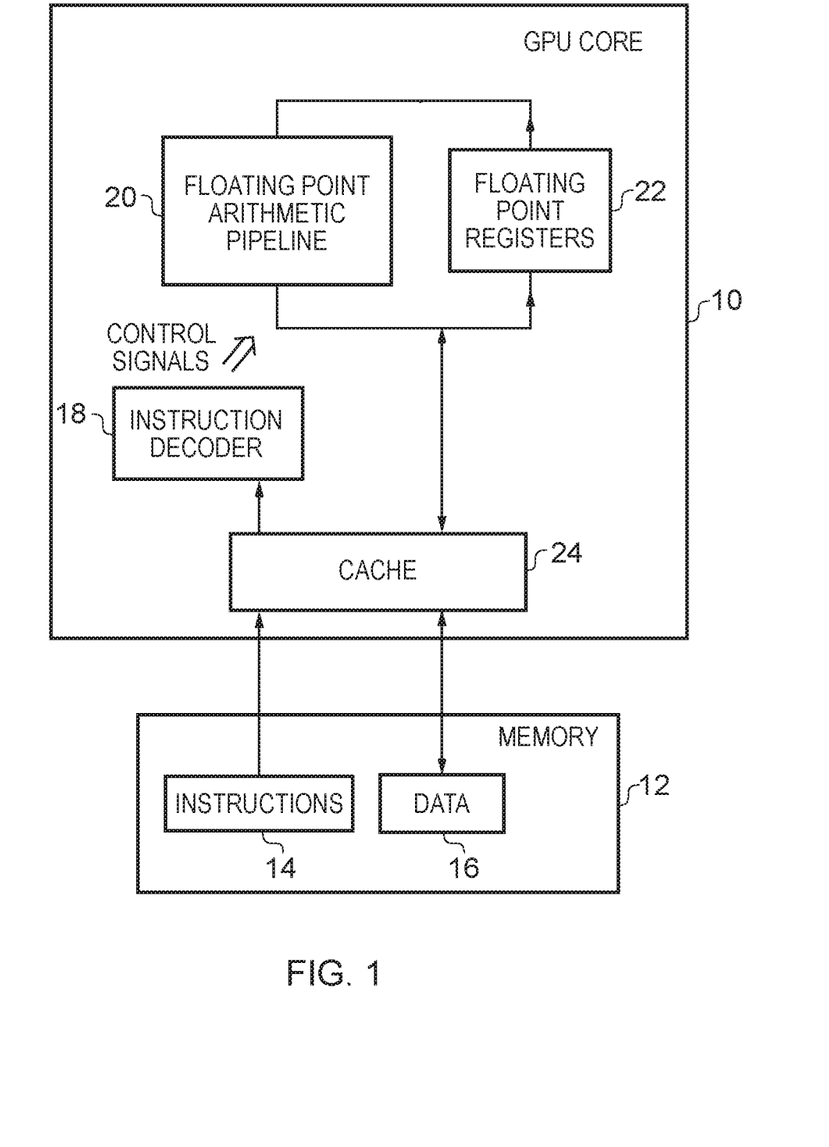
FIG. 1 schematically illustrates a GPU core and memory in one embodiment.

FIG. 1 schematically illustrates a data processing apparatus 10 in one embodiment. Here the data processing apparatus 10 is embodied as a graphics processing unit (GPU) core. The GPU core 10 performs data processing operations by accessing memory 12, in which instructions 14 and data 16 are stored. Instructions 14 retrieved from the memory 12 are decoded by an instruction decoder 18 which then controls the operation of the floating point arithmetic pipeline 20 and the floating point registers 22 via control signals resulting from the decoding of those instructions. Selected data items which are subject to data processing operations by the GPU core 10 are retrieved from the memory 12 and are temporarily stored in the floating point registers 22 for data processing within the floating point arithmetic pipeline 20. Data items are then also written back from the floating point registers 22 to specified storage locations in the memory 12 as required. The GPU core 10 further comprises a cache 24 to hold local copies of data items retrieved from memory 12, in a manner with which one of ordinary skill in the art will be familiar. One particular data processing operation which the GPU core 10 carries out is the accumulation of floating point values. The technique by which this accumulation is performed is described in more detail with reference to the following figures.

Figure 2:
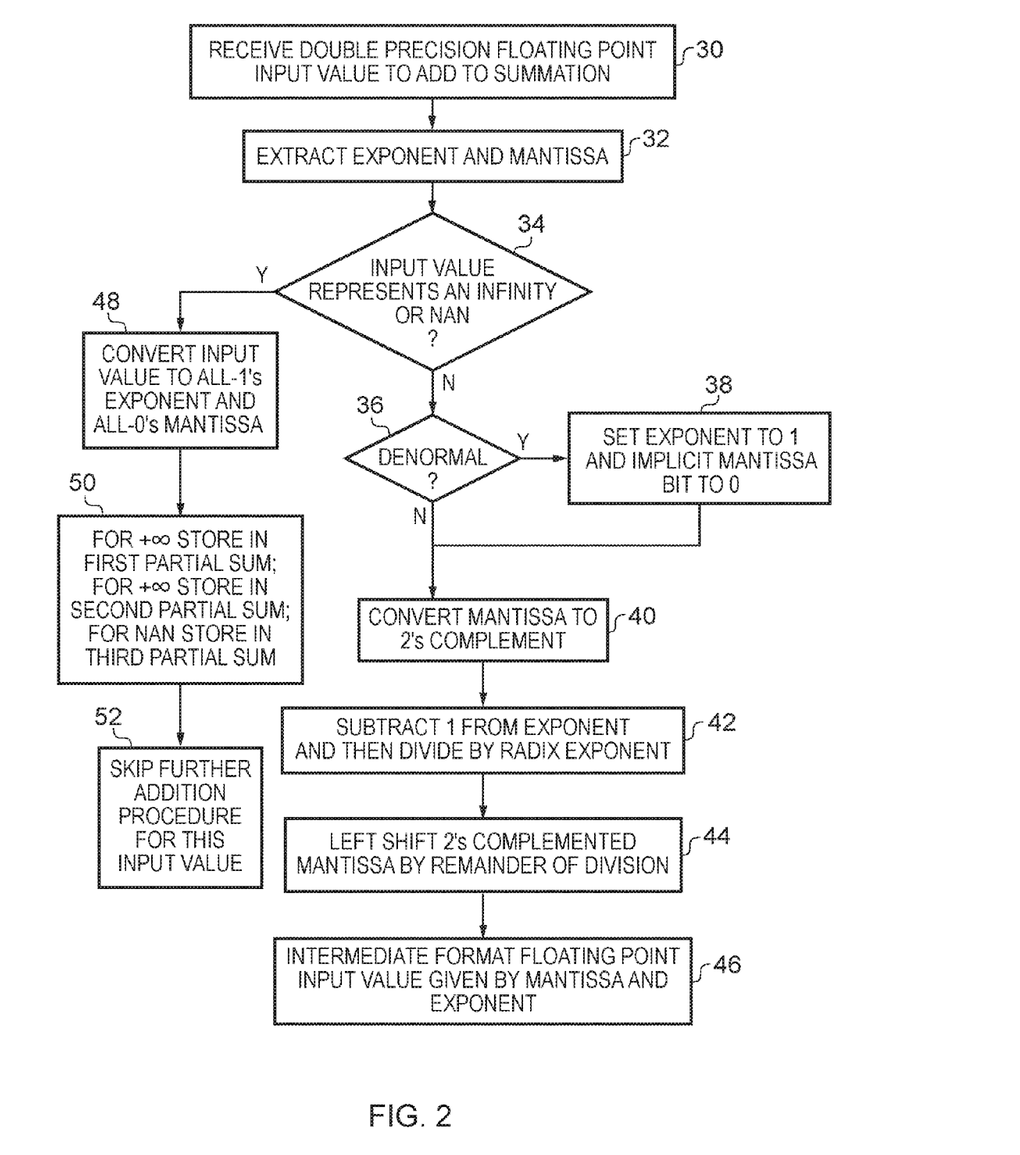
FIG. 2 shows a sequence of steps via which a received floating point input value is converted into an intermediate format in one embodiment.

FIG. 2 shows a sequence of steps via which a received floating point input value is converted into an intermediate format. In this example, the floating point input value is received in 64-bit IEEE double precision format (i.e. having a sign bit, 11 exponent bits and 52 explicit mantissa bits (and one implicit mantissa bit)). In the figure, the reception of this double precision floating point input value to be added to the summation (i.e. to be accumulated) is shown as step 30. At step 32 the exponent and mantissa of this input value are extracted and then at step 34 it is determined if the input value represents an infinity (whether positive or negative) or Not-A-Number. If the input value is not one of these ("special case") values then the flow proceeds to step 36 where it is determined if the floating point input value is denormal. If it is then the flow proceeds via step 38 where the exponent is set to 1 and the implicit mantissa bit is set to 0. Then at step 40 the mantissa (and sign) are converted into two's complement representation. At step 42 one is subtracted from the exponent, and it is then divided by a radix, which in this example is 29. This generates a resulting exponent which is the exponent value which will be used in the intermediate format. At step 44 the two's complemented mantissa is left-shifted by the remainder of the division performed at step 42. The resulting mantissa is thus the two's complement of the mantissa of the floating point input value at most shifted 28 bits up from its least significant bit (LSB). Note that the "unused" top end of the mantissa is then what defines the maximum number of input values that can be accumulated without overflow. For example, where the intermediate format is given in 130-bit representation, in which there is a 7-bit exponent and a 123-bit mantissa, this gives: 123-bit storage−(54-bit explicit mantissa with sign+28-bit worst case shift)=41-bit summation headroom. In other words, this example implementation can sum $2^{31}$ worst case items before overflowing. Step 46 shows the intermediate format (130-bit in this example) floating point input value being given by the mantissa (123 bit) and exponent (7-bit) determined according to the preceding steps. Returning to a consideration of step 34, if it is determined that the input value does represent one of the "special case" values, then the flow proceeds to step 48, where the 64-bit double precision floating point input value is convened to a representation with all ones in the exponent and all zeros in the mantissa. Then, at step 50 a representation of plus infinity is stored as a first partial sum, a representation of minus infinity is stored as a second partial sum and a representation of NaN is stored as a third partial sum. Then, as shown in step 52 further addition (accumulation) is skipped for this input value.

Figure 3:
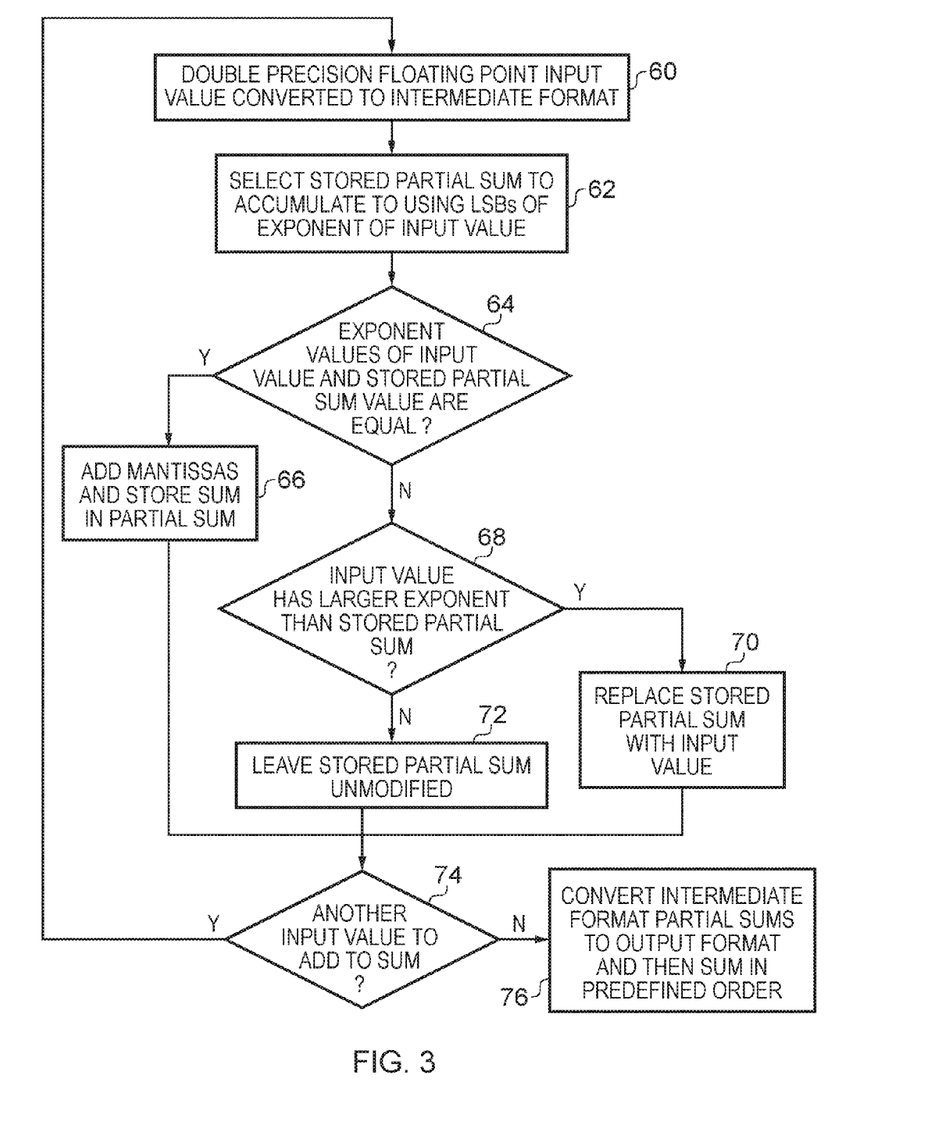
FIG. 3 shows a sequence of steps via which intermediate format floating point values are accumulated in one embodiment.

FIG. 3 shows a sequence of steps by means of which a received floating point input value which has been converted into the intermediate format discussed above is accumulated. Step 60 shows that a double precision floating point input value has been converted into the intermediate format (for example as described above with reference to FIG. 2). Then at step 62 one of four partial sums to which this input value will be temporarily accumulated is selected on the basis of the two LSBs of the exponent of the input value. Then, at step 64, the exponent of the expanded (intermediate format) value and the exponent of the value stored in the partial sum selected at step 62 are compared. If they are found to be equal then the flow proceeds to step 66 where the respective mantissas (i.e. of the input value the in intermediate format and of the stored value in the selected partial sum) are added together and the resulting mantissa sum is then stored in the selected partial sum. The exponent value of the partial sum is kept unchanged. If however at step 64 the exponent values are found to be not equal then at step 68 it is determined if the input value (in intermediate format) has a larger exponent then the value stored in the selected partial sum. If it does, then at step 70 the stored partial sum is replaced with the input value (in the expanded intermediate format). If however, the stored value has the larger exponent then (step 72) the stored partial sum is left unmodified. At step 74 it is determined if there is another floating point input value to be accumulated (added to the sum) and whilst this is true the flow returns to step 60 for the procedure to be repeated for that new input value. Once all floating point input values to be accumulated have been added to the partial sums, then the flow proceeds to step 76 where the individual intermediate format partial sums are converted to the required output format, which in this example is again 64-bit double precision floating point representation (although it should be noted that the output format may differ from the input format, and could for example be wider). The output formatted partial sums are then summed in a predefined order to generate the output value.

Note with respect to the above-discussed conversion to two's complement format that as the mantissa is two's complement created from the original mantissa and sign bit, the described system can represent and sum positive, negative and mixed numbers (i.e. one addend positive, the other negative). In the case of mantissa cancellation note that the exponent value is not reduced—it always follows the above discussed rules of replacement only. This means that an all-zeroes mantissa (with a not-all-ones exponent) is a valid encoding (of zero) in the described format, and that the exponent will keep the value of addition that cancelled. If a subsequent input floating point value to be summed has a lower exponent, it will be discarded even if the element sum is actually zero and the incoming value is not. This may not be intuitive at first glance, but comes from the associative property: even if the smaller value comes later than the previous cancelling larger summation, the algorithmic result is as if the smaller value came first.

Figure 4:
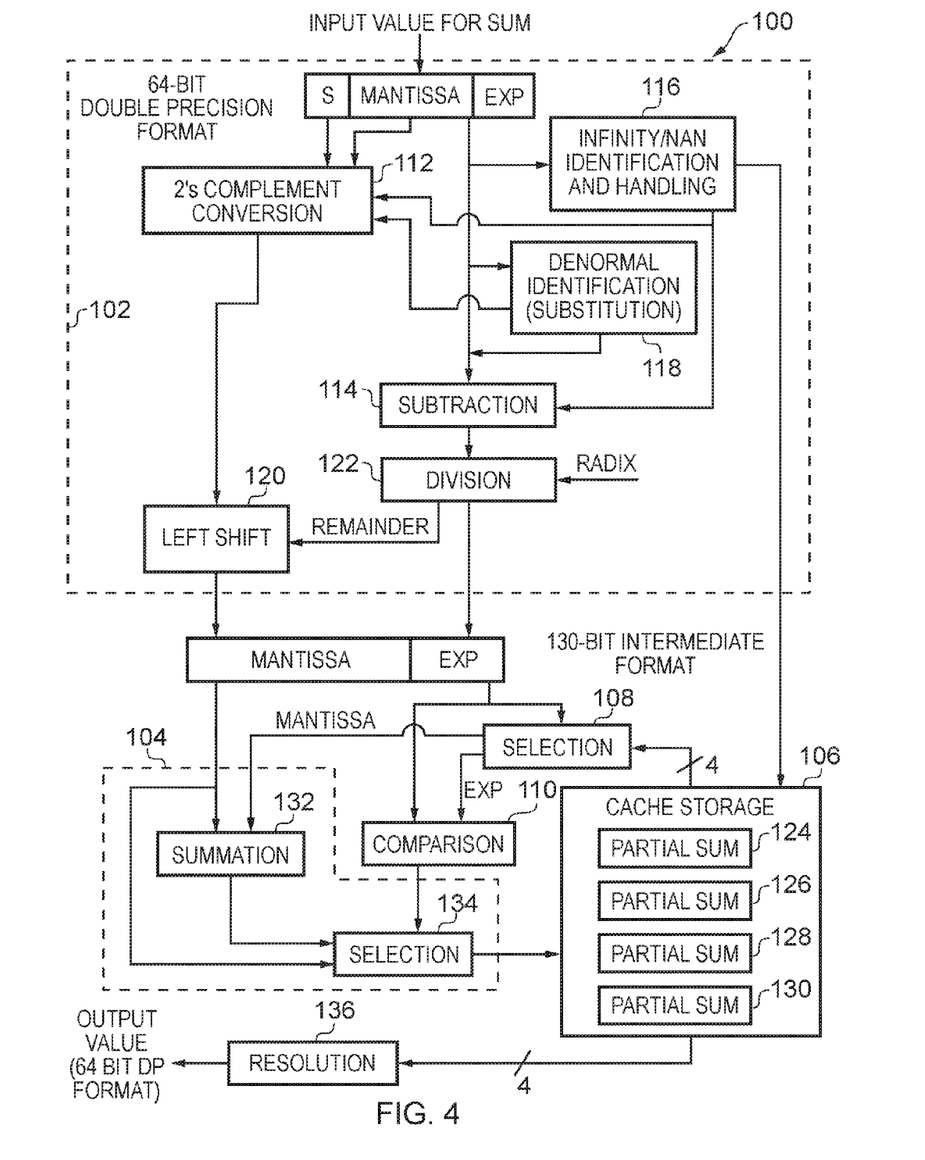
FIG. 4 schematically illustrates the configuration of the apparatus in one embodiment.

FIG. 4 schematically illustrates an apparatus of one embodiment to carry out the present techniques. The apparatus 100 generally comprises conversion circuitry 102, accumulation circuitry 104, storage circuitry (cache) 106, selection circuitry 108 and comparison circuitry 110. A floating point input value (here in 64-bit double precision format) to be accumulated is received by the conversion circuitry 102, wherein the sign and mantissa components of the input value are first received by the two's complement conversion circuitry 112, whilst the exponent component is received by the subtraction circuitry 114. In addition, the exponent is also received by the "special case" handling circuitry 116, which determines on the basis of the exponent if an infinity or NaN is represented by the input value. If one of these special case input numbers is identified then (as described above with reference to step 48, 50 and 52 in FIG. 2) the infinity/NaN handling circuitry 116 causes plus infinity, minus infinity and NaN to be stored in three of the respective partial sums in the cache storage 106. The identification of one of these special numbers is also signalled to subtraction circuitry 114 and two's complement conversion circuitry 112, so that further accumulation of this input value is halted. The exponent of the input value is also received by the denormal identification circuitry 118 and if a denormal input value is identified then the denormal identification circuitry 118 substitutes a value of one for the exponent for this input value, and signals to the two's complement circuitry 112 that the implicit mantissa bit should be set to 0 before the conversion to two's complement format is performed.

The two's complemented mantissa generated by circuitry 112 is received by the left shift circuitry 120. The subtraction circuitry 114 subtracts one from the exponent value it receives and then division circuitry 122 divides this value by a predefined radix, which in this example is 29. The remainder of this division is passed to the left shift circuitry 120 to define the number of bits via which the left shift should occur. The output of the left shift circuitry 120 thus provides the mantissa value of the 130-bit intermediate format, whilst the exponent value generated by the divisional circuitry 122 provides the corresponding exponent value. The thus-converted input value is then compared to the stored content of a selected one of the partial sums 124, 126, 128 and 130 stored in the cache storage 106. The initial value of each partial sum before summation starts is an all-0s bit pattern, with both exponent and mantissa being 0. The four partial sums 124-130 can be considered to be indexed from 0 to 3 and the bottom two exponent bits (2 LSBs) are not stored directly but inferred from index. As such the mantissa and the remaining five bits of the exponent will then fit into 128 bits. Note that as the per sum exponent stored is thus 5 bits, the effective radix per element is $2^{(29*4)}=2^{116}$. Since the values for a given exponent can vary by a factor of $2^{29}$ (minus an epsilon), this defines a worst-case minimum distance between kept and discarded values of $2^{87}$.

The selection of which partial sum to compare against is determined by the 2 LSBs of the exponent by selection circuitry 108, which passes the exponent of the selected partial sum to comparison circuitry 110 and the mantissa to the summation circuit 132 of the accumulation circuitry 104. The summation circuitry 132 then performs a 123-bit addition of the mantissas, whilst in parallel the comparison circuitry 110 compares the exponents in order to determine whether the addition-sum of the summation circuitry 132 is to be used or instead if one of the inputs should be kept. The delay of these parallel steps (implemented in this embodiment by one adder and one multiplexer) is thus kept within one execution cycle. The result of the comparison determines which of the inputs to selection circuitry 143 is stored to the selected partial sum in the cache storage (if required— no storage is carried out if the stored value has the larger exponent). Once all floating point input values to be accumulated have been added to the partial sums 124-130 in cache storage 106, then the resolution circuitry 136 retrieves the four partial sums, converts each into 64-bit double precision format, and then sums them in a predetermined order to give the output value. The resolution circuitry 136 is also configured to detect an all-ones exponent in the partial sums and, if such an exponent is detected, to convert the corresponding partial sum floating-point value into a representation of infinity or Not-a-Number appropriate format to be output as the sum.

It is to be noted that because the summation procedure is associative this means that two or more data items can be combined and then the combined data items can be added to a third item all at once. Hence, if the summation procedure is implemented as a memory atomic operation, it is possible to perform atomic-coalescing. Further, note that when performing the summation, a local sum can be stored in a local cache line using the described format, accumulating a sum from potentially many threads, and then when the cache line actually arrives from memory, the sums arriving from memory can be combined with the sum accumulated in the cache line. This way, it is possible in a multicore GPU to perform associative accumulation of floating-point values to a single memory accumulator in such a way that the performance scales with the number of GPU cores.

Figure 5A:
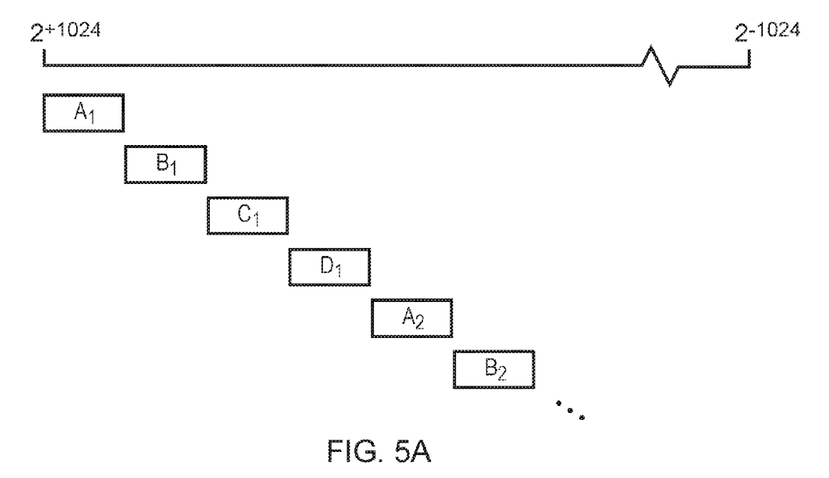
FIGS. 5A and 5B illustrate how the floating point input value range is sub-divided into "buckets" in two embodiments.
Figure 5B:
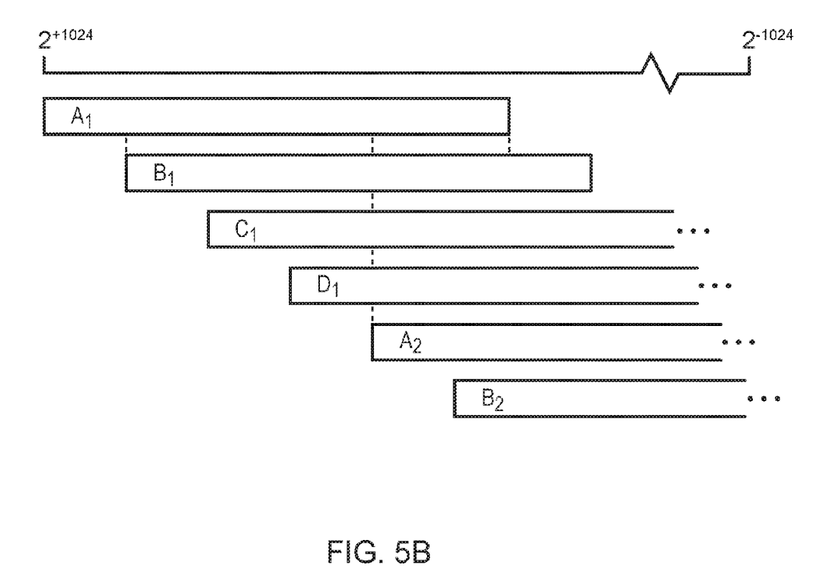

FIGS. 5A and 5B schematically illustrate the ranges of the intermediate format floating point values, in the examples shown (for a 128-bit value) these ranging from $2^{+1024}$ to $2^{-1024}$. The boxes shown in each figure show examples of how these ranges are covered by the above-mentioned "bucket classes", in examples in which four partial sums are maintained (these four corresponding to the reference letters A-D). In the example of FIG. 5A there is no overlap between the buckets of each bucket class, but in the example of FIG. 5B there is significant overlap between the buckets. Indeed note that there is not only overlap between adjacent buckets (e.g. $A_1$ and $B_1$), but there is also overlap between sequential buckets in each class (e.g. $A_1$ and $A_2$). Where there is significant overlap between the buckets, this means that a great number of mantissa values can be accumulated in each bucket without overflow.

Figure 6:
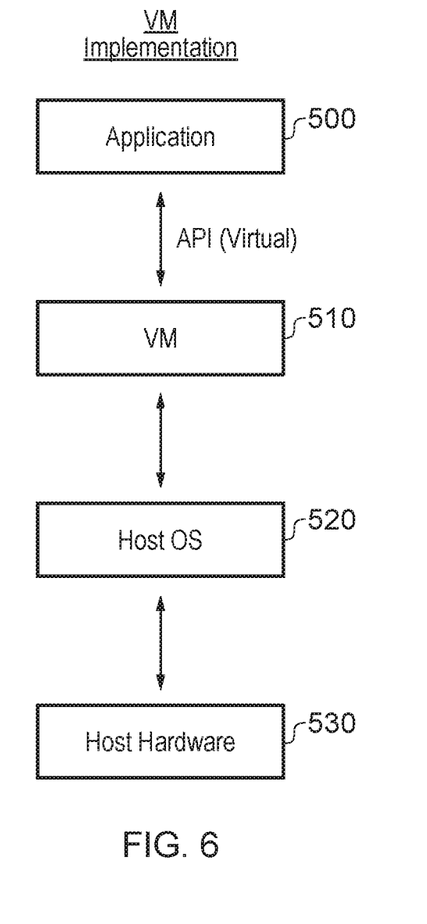
FIG. 6 schematically illustrates a virtual machine implementation of the present techniques in one embodiment.

FIG. 6 illustrates a virtual machine implementation that may be used. Whilst the above described embodiments implement the present techniques in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, program instructions to cause the above-described method to be carried out may be executed from within the application program 500 using the virtual machine program 510 to model their interaction with the virtual machine hardware.

By way of overall summary, an apparatus and method for generating a sum of floating-point input values are provided. To sum the values multiple partial sum floating-point values are maintained and the partial sum to which an input value may be added is selected by a least significant portion of the exponent of the input value. If the exponent of the input value is equal to the exponent of the value stored in the selected partial sum a mantissa sum of the input value and stored partial sum value replaces the mantissa value of the selected partial sum value. If the exponent of the input value is larger than the exponent of the value stored in the selected partial sum the selected partial sum value is replaced with the input value. An associative and deterministic summation is thus provided.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus for generating a sum of floating-point input values, the apparatus comprising:
   storage circuitry to store multiple partial sum floating-point values;
   selection circuitry to select a partial sum floating-point value of the multiple partial sum floating-point values in dependence on a least significant portion of a first exponent value for a floating-point input value;
   comparison circuitry to compare the first exponent value with a second exponent value stored for the selected partial sum floating-point value; and
   accumulation circuitry to perform an addition procedure, wherein the addition procedure comprises:
   replacing a mantissa value of the selected partial sum floating-point value with a mantissa sum of the floating-point input value and the selected partial sum floating-point value, when the first exponent value and the second exponent value are equal; and
   replacing the selected partial sum floating-point value with the floating-point input value in the selected partial sum floating-point value, when the first exponent value is larger than the second exponent value.

2. The apparatus as claimed in claim 1, wherein the storage circuitry has structure to store the multiple partial sum floating-point values without a least significant portion of the second exponent value,
   wherein the least significant portion of the second exponent value matches the least significant portion of the first exponent value in size, and
   wherein the least significant portion of the second exponent value matches the number of the multiple partial sum floating-point values,
   such that the least significant portion of the second exponent value can be inferred from the multiple partial sum floating-point value in which it is stored.

3. The apparatus as claimed in claim 1, wherein the addition procedure comprises performing the mantissa sum concurrent with the comparison circuitry comparing the first exponent value with the second exponent value.

4. The apparatus as claimed in claim 1, comprising special number conversion circuitry responsive to reception of a floating-point input value representing infinity or Not-a-Number in the input format to:
   convert the floating-point input value number to a representation with an all-ones exponent and an all-zeroes mantissa;
   store a positive infinity value in a first partial sum floating-point value of the multiple partial sum floating-point values;
   store a negative infinity value in a second partial sum floating-point value of the multiple partial sum floating-point values; and store a Not-a-Number value in a third partial sum floating-point value of the multiple partial sum floating-point values.

5. The apparatus as claimed in claim 4, wherein the apparatus is responsive to detection of a partial sum floating-point value having the all-ones exponent to convert the partial sum floating-point value having the all-ones exponent into a representation of infinity or Not-a-Number in the input format to be output as the sum.

6. The apparatus as claimed in claim 1, further comprising conversion circuitry to convert the floating-point input value into an intermediate format,
wherein an encoding space for the floating-point input value in the intermediate format is larger than an encoding space in an input format for the floating-point input value as received by the conversion circuitry,
and wherein the storage circuitry, selection circuitry, comparison circuitry and accumulation circuitry process the floating-point input value in the intermediate format.

7. The apparatus as claimed in claim 6, wherein the conversion circuitry has substitution circuitry to substitute a value of one for the first exponent value for the floating-point input value in the input format in response to reception of a denormal floating-point input value.

8. The apparatus as claimed in claim 6, wherein an expressible exponent range of values in the intermediate format is smaller than an expressible exponent range of values in the input format of the floating-point input value.

9. The apparatus as claimed in claim 6, wherein an expressible mantissa range of values in the intermediate format is larger than an expressible mantissa range of values in the input format of the floating-point input values.

10. The apparatus as claimed in claim 6, wherein the conversion circuitry is capable of applying a radix when converting the floating-point input value into the intermediate format, wherein the radix is an exponent multiplicative factor to decrease the size of the encoding of the first exponent value when expressed in the intermediate format.

11. The apparatus as claimed in claim 6, wherein the conversion circuitry is capable of converting a mantissa value of the floating-point input value into a sign magnitude representation for the intermediate format.

12. The apparatus as claimed in claim 6, comprising resolution circuitry, responsive to an indication that all floating-point input values for the sum have received and processed, to convert each of the multiple partial sum floating-point values to an output format and then to sum the input formatted multiple partial sum floating-point values in a predefined order to give the sum for output in the output format.

13. The apparatus as claimed in claim 12, wherein the output format is the input format.

14. The apparatus as claimed in claim 12, wherein the output format is wider than the input format.

15. The apparatus as claimed in claim 6, wherein the conversion circuitry is capable of converting a mantissa value and a sign value of the floating-point input value into a two's complement representation for the intermediate format.

16. The apparatus as claimed in claim 15, wherein the conversion circuitry is capable of applying a radix when converting the floating-point input value into the intermediate format, wherein the radix is an exponent multiplicative factor to decrease the size of the encoding of the first exponent value when expressed in the intermediate format, and wherein the conversion circuitry has subtraction circuitry to subtract one from the first exponent value in the input format, and division circuitry to then divide the first exponent value by the radix, to give the first exponent value in the intermediate format.

17. The apparatus as claimed in claim 16, wherein the conversion circuitry comprises shift circuitry to left-shift the two's complement representation of the mantissa value by a remainder of division of the first exponent value by the radix to give the mantissa value in the intermediate format.

18. A method of generating a sum of floating-point input values in a data processing apparatus comprising the steps of:
storing, in storage circuitry, multiple partial sum floating-point values;
selecting, by selection circuitry, a partial sum floating-point value of the multiple partial sum floating-point values in dependence on a least significant portion of a first exponent value for a floating-point input value;
comparing, by comparison circuitry, the first exponent value with a second exponent value stored for the selected partial sum floating-point value; and
performing, accumulation circuitry, an addition procedure, wherein the addition procedure comprises:
replacing a mantissa value of the selected partial sum floating-point value with a mantissa sum of the floating-point input value and the selected partial sum floating-point value, when the first exponent value and the second exponent value are equal; and
replacing the selected partial sum floating-point value with the floating-point input value in the selected partial sum floating-point value, when the first exponent value is larger than the second exponent value.

19. A computer-readable storage medium in which are stored in a non-transient fashion computer-readable program instructions, wherein when executed on a computing device the computer-readable program instructions cause the computing device to carry out the method of claim 18.

* * * * *